United States Patent [19]
Levene

[11] Patent Number: 5,206,918
[45] Date of Patent: Apr. 27, 1993

[54] COLOR ANALYSIS BASED UPON TRANSFORMATION TO SPHERICAL COORDINATES

[75] Inventor: Susan B. Levene, Stamford, Conn.

[73] Assignee: Kraft General Foods, Inc., Northfield, Ill.

[21] Appl. No.: 679,888

[22] Filed: Apr. 3, 1991

[51] Int. Cl.$^5$ .............................................. G06K 9/36
[52] U.S. Cl. ........................................ 382/17; 382/18; 382/1
[58] Field of Search .......................... 382/17, 18, 51, 1; 364/526; 358/106; 395/131

[56] References Cited

U.S. PATENT DOCUMENTS

| | | |
|---|---|---|
| 3,745,527 | 7/1973 | Yoshimura et al. ................... 382/17 |
| 3,999,047 | 12/1976 | Green ..................................... 382/17 |
| 4,583,186 | 4/1986 | Davis et al. ........................... 364/526 |
| 4,623,973 | 11/1986 | Hoffrichter et al. ................. 364/526 |
| 4,624,367 | 11/1986 | Shafer et al. ......................... 209/577 |
| 4,731,663 | 3/1988 | Kovalchick et al. ................. 382/17 |
| 4,735,323 | 4/1988 | Okada et al. ......................... 209/582 |
| 4,797,738 | 1/1989 | Kashi et al. .......................... 382/17 |
| 4,812,904 | 3/1989 | Maring et al. ........................ 382/17 |
| 4,991,223 | 2/1991 | Bradley ................................. 382/17 |
| 5,062,066 | 10/1991 | Scher et al. .......................... 364/149 |
| 5,085,325 | 2/1992 | Jones et al. ........................... 382/17 |

Primary Examiner—David K. Moore
Assistant Examiner—David Fox
Attorney, Agent, or Firm—Thomas R. Savoie

[57] ABSTRACT

A color analysis and evaluation method is disclosed based upon a transformation of three primary color measurements, red, blue and green, from an x,y,z cartesian coordinate system to a rotated spherical coordinate system in which a target color vector in the cartesian coordinate system defines the primary z axis in the rotated spherical coordinate system. In one disclosed embodiment, a computerized color analysis is performed upon a finished baked product such as a pound cake with a split in the top thereof. A detector such as a color television camera measures three primary color components of each pixel of a matrix of pixels into which an image of the product is divided by the detector. The three measured primary color components are then transposed to a reference spherical coordinate system having the z axis aligned with a target color for the product. A determination is then made as to whether a measured color vector is within predetermined limits to determine if it is within an acceptable color sector.

12 Claims, 5 Drawing Sheets

COLOR ANALYSIS BASED UPON TRANSFORMATION TO SPHERICAL COORDINATES

BACKGROUND OF THE INVENTION

1. Field of the Invention

The present invention relates generally to a color analysis and evaluation method based upon a transformation of three primary color measurements from an x,y,z cartesian coordinate system to a spherical coordinate system.

More particularly, the subject invention pertains to a color analysis and evaluation method based upon a transformation of three primary color measurements from an x,y,z cartesian coordinate system to a rotated spherical coordinate system in which a target color vector in the cartesian coordinate system defines the primary z axis in the rotated spherical coordinate system. In one disclosed embodiment, a computerized color analysis method uses a color camera to take a picture of a finished baked product, and rates its overall appearance by measuring specific features and comparing them to standard measurements for the product.

2. Discussion of the Prior Art

Color monitors, video cameras and computer graphics often treat color as a combination of three primary colors, red, green and blue (RGB). Red, green and blue are called additive primary colors because adding various amounts of each color produces a single perceived color in the visible spectrum. Another traditional color specification method, popular in the publishing industry for mixing inks, is based on combining the subtractive primaries, cyan, yellow, magenta and black (CYMK). Television broadcast represents color with yet another method in which RGB signals are encoded into luminance (Y) and chrominance (I and Q) signals to facilitate broadcasting. Three common amplitude domains exist for color measurements. RGB is a "tri-mono" representation where luminance and color information are encoded among the red, green and blue and components. YPrPb is a rectangular color representation wherein color is represented in cartesian coordinates and augmented with an independent luminance (Y) signal. Finally, hue-saturation-value (HSV) is a polar color representation wherein color is represented in polar coordinates, and saturation represents the distance, r, from the origin, and hue, the angle. This color information is augmented with an independent luminance value (V).

Color image processing can be much less complicated and quicker to execute if color images captured from RGB video sources can be digitally converted from RGB data to hue-saturation-intensity (HSI) data.

In addition to facilitating straightforward computer processing, thinking about and specifying color in terms of HSI values may closely approximate the way humans perceive and interpret color. Hue, for example, is a color attribute that describes a pure color, such as pure red, pure yellow, pure green, pure blue, pure purple, or some intermediate between these. Hue is what we are typically referring to when we use the term "color." Saturation is another color attribute that describes the degree to which a pure color is diluted with white. A highly saturated color has a low white content. Intensity is a color-neutral attribute that describes the relative brightness or darkness. The intensity of a color image corresponds to the gray-level (black and white) version of the image.

FIG. 1 illustrates an equilateral triangular color map having the three primary colors RBG at its three vertices. The equilateral triangle maps out the large range of reproducible colors in the visual spectrum and is useful in understanding color. This equilateral triangle is used to map RGB chromaticity coordinates. Pure hues can be selected by moving around the perimeter. Saturation can be decreased by moving toward white, while intensity can be varied by moving perpendicularly through white on a third axis.

Unlike color images represented in RGB color space, images composed of hue, saturation and intensity values can be analyzed simply because the HSI values themselves can be processed individually and independently. Convolution, for example, can be performed on a color image using just the intensity component of an HSI color image. A histogram can be generated based solely on hue data in order to learn about the frequency distribution of hues. Performing similar operations on RGB images is more complicated, requiring at least three times as many computations, since RGB values must all be manipulated.

Color image processing has seen somewhat limited application thus far because of the drawbacks of working with images stored in the traditional red, green and blue format. Although most video cameras and display monitors capture and display signals in the RGB domain, and graphics systems generate images by combining RGB values, capturing and processing images made up of RGB data is highly inefficient. In a computer system (or frame grabber), separate frame buffers hold the red, green and blue data comprising the color image. The three buffers must be looked at together to be analyzed or processed. Inefficient color processing results because, in effect, operations must be performed three times.

Hue-saturation-intensity color space is amenable to more efficient processing because the HSI frame buffers comprising the color image are relatively uncorrelated with one another. These buffers individually provide useful information when interpreting a color scene.

Mathematically, it is relatively easy to change a color or an entire color image from the RGB color space to the HSI color space. If the RGB coordinates are thought of as being produced by an RGB camera, then the intensity of any color at that point will be given by:

$$I = \frac{R + B + G}{3} \qquad \text{Equation 1}$$

Further, the hue of the color can be represented as the angle resulting from a vector rotating about the white point (R=G=B point). A hue angle of zero degrees corresponds to any point on the line drawn from the white point at the triangle's center to the red vertex; thus hue can be given by:

$$H = \frac{1}{360}\left[90 - \text{ArcTan}\left(\frac{F}{\sqrt{3}}\right) + \{0, G > B; 180, G < B\}\right] \qquad \text{Equation 2}$$

$$F = \frac{2R - G - B}{G - B} \qquad \text{Equation 3}$$

Saturation can be obtained by:

$$S = 1 - \left[ \frac{\min(R, G, B)}{I} \right]$$ Equation 4

In Equation 4, the lowest value of either R/I, G/I, or B/I is subtracted from 1 to give the saturation. Thus for a color with zero saturation (white), R/I=G/I=B/I=1. The value of saturation is 0.

Hardware has been developed to address the RGB to HSI conversions. Data Translation (Marlboro, Mass.) has developed two 15-MHz CMOS ICs for performing RGB-to-HSI and HSI-to-RGB color space transformations. Designed for use in color frame-grabber boards from DT, these converter chips can transform 512×512 pixel color images in real time. The RGB/HSI converter receives 8-bit hue, 8-bit saturation and 8-bit intensity values for storage and processing. The HSI/RGB converter transforms the HSI data back to RGB pixel values after processing for display.

SUMMARY OF THE INVENTION

Accordingly, it is a primary object of the present invention to provide a color analysis and evaluation method based upon a transformation of three primary color measurements from an x,y,z cartesian coordinate system to a spherical coordinate system.

A further object of the subject invention is the provision of a color analysis and evaluation method based upon a transformation of three primary color measurements from an x,y,z cartesian coordinate system to a rotated spherical coordinate system in which a target color vector in the cartesian coordinate system defines the primary z axis in the rotated spherical coordinate system. In one disclosed embodiment, a computerized color analysis method uses a color camera to take a picture of a finished baked product, and rates its overall appearance by measuring specific features and comparing them with standard measurements for the product.

In accordance with the teachings herein, the present invention provides a method of analyzing a detected color comprising the steps of detecting and measuring three primary color components of the detected color in an x,y,z cartesian coordinate system in which the three measured primary color components are three magnitudes along respectively the x,y and z axes of the coordinate system. The three color magnitudes in the x,y,z cartesian coordinate system are then transposed to a spherical coordinate system by determining $\rho$, $\theta$ and $\phi$ for the three color components in a spherical coordinate system, in which $\rho$ is the magnitude of a vector in the spherical coordinate system defined by the three color magnitudes in the x,y,z coordinate system, $\theta$ is the angle in the spherical coordinate system from the x axis to a projection of the vector $\rho$ onto the x,y plane, and $\phi$ is the angle in the spherical coordinate system from the z axis to the vector $\rho$. The color vector in the spherical coordinate system as represented by the $\rho$, $\theta$ and $\phi$ coordinates is analyzed by determining if it is within predetermined $\theta$ and $\phi$ angular color limits.

In greater detail, a reference target color vector is established having reference color coordinates $\rho_o$, $\theta_o$, $\phi_o$, and the z axis in a rotated reference spherical coordinate system is defined by the reference color vector of $\rho_o$, $\theta_o$, $\phi_o$, and the $\rho$, $\theta$ and $\phi$ values of a measured color are calculated as new values $\rho'$, $\theta'$ and $\phi'$ in the rotated reference spherical coordinate system.

In a preferred embodiment, the three measured primary color components are red, green and blue, but in alternative embodiments they could be subtractive or negative primary color components, or could be other primary color components.

In one specific embodiment, the present invention provides a method of analyzing a detected color of an object or image in which the object or image is scanned with a detector such as a color television camera to measure three primary color components of each pixel of a matrix of pixels into which the object or image is divided by the detector. The three measured primary color components are then transposed to a rotated reference spherical coordinate system, and an average ratio is calculated of at least two color components for all pixels, which defines the relative hue of those at least two color components by a measured color vector within the rotated reference spherical coordinate system. Next a determination is made as to whether the measured color vector is within predetermined limits to determine if it is within an acceptable color sector. In greater detail, the arctangent is determined of the average ratio of the two color components to determine an average color angle $\theta$ within the rotated reference spherical coordinate system.

In one specific exemplary embodiment herein, the present invention relates to a method of rating the quality of color of an object such as a baked product, more particularly a pound cake having a split on the top thereof which assumes a less brown or tan color than the area of the pound cake outside of the split. One current method for rating the quality of baked products such as pound cakes having a split on the top thereof is to have master bakers give their opinion on the overall appearance and key characteristics of the products. Within the context of the present invention, the experts' opinions are utilized to develop standard criterion and specifications which enable a computerized color analysis method to make objective and consistent measurements of deviations of a product's characteristics from the standard specifications. In this exemplary embodiment, a computerized visual inspection system uses a color camera to take a color picture of the finished baked product, and rates its overall appearance by measuring specific features and comparing the measured features to standard measurements for the baked product which are considered to be optimum.

Several prior art color analysis techniques are based upon algorithms designed for a color object or image of interest which has a specific shape and specific dimensions. The tolerances and thresholds built into these prior art systems use algorithms that are designed for an object or image having a variable size and shape, but specifically do not deal with a variability of size, shape and color of objects. Many of the quality attributes of objects such as baked products are not simple dimensional measurements. Pursuant to the present invention, an algorithm executed by a computer analyzes the color picture to determine the location and area which are defined by a similarity of color characteristics, and also by criterion of shape and size characteristics. The algorithm provides the system with the flexibility needed to isolate the features of an area of interest in objects. The algorithm generates a histogram for at least one of the color components by determining the number of pixels having each of a number of subdivisions of magnitude into which the color component is divided, wherein a first axis of the histogram is each subdivision of the magnitude of the color component, and a second axis of the histogram is the number of pixels in the image having each subdivision of magnitude.

The generated histogram is utilized to determine an area of interest of the object or image, and the transposing step to a spherical coordinate system is performed only within the determined area of interest. In one disclosed embodiment, only one selected color component (red) is utilized to generate the histogram, and the optimum color sector is defined by $\theta$, with blue being the primary axis. Maximas and minimas of the generated histogram are utilized to generate a masked area of interest to mask the remaining color components within the masked area prior to transposing to a spherical system. In the disclosed embodiment, the object is a baked product having a split, the masked area of interest is the area of the split, and the color analysis is performed to control the baking temperature of an oven for the baked product.

The advantages of the present invention when applied to the evaluation of baked products include consistent ratings, information is provided to nonexperts on product quality, an ability to 100% inspect products automatically, and an ability to inspect products to generate process control data.

The process control which is enabled by the present invention may be effected in either an on-line or an off-line manner. Further, although disclosed specifically for controlling the oven temperature for baked goods, the methodology of the present invention can be adapted by those skilled in the art to other uses, such as the control of a coffee roaster by conducting color analysis of roasted coffee beans, the control of drying conditions by conducting color analysis of dried green vegetables, and the control of aging conditions for an aging cheese by conducting a color analysis thereon during the aging process.

BRIEF DESCRIPTION OF THE DRAWINGS

The foregoing objects and advantages of the present invention for color analysis based upon transformation to spherical coordinates may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The present invention measures the closeness of a color to a selected target color, and is applicable to color analysis in general over the complete color spectrum.

Figure 2:
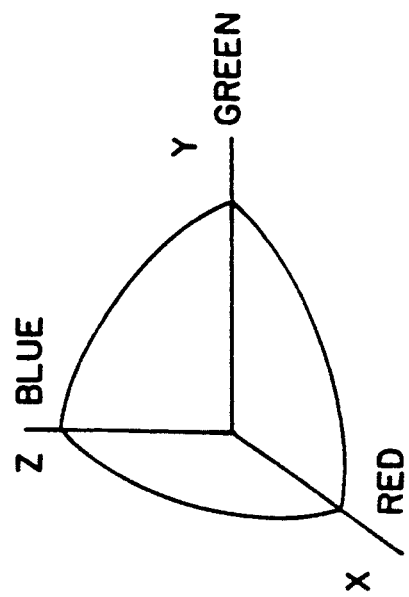
FIG. 2 illustrates a cartesian x,y,z coordinate system for plotting a specific measured color variable according to its measured components of red, blue and green.

Currently cameras and image processing by computers frequently organize color into three primary components such as red, green and blue. In spatial coordinates, the color system is located in the first quadrant, as illustrated in FIG. 2. For example, saturated green has coordinates (0, 200, 0), while saturated yellow (a mixture of red and green) has coordinates (200, 200, 0).

Figure 3:
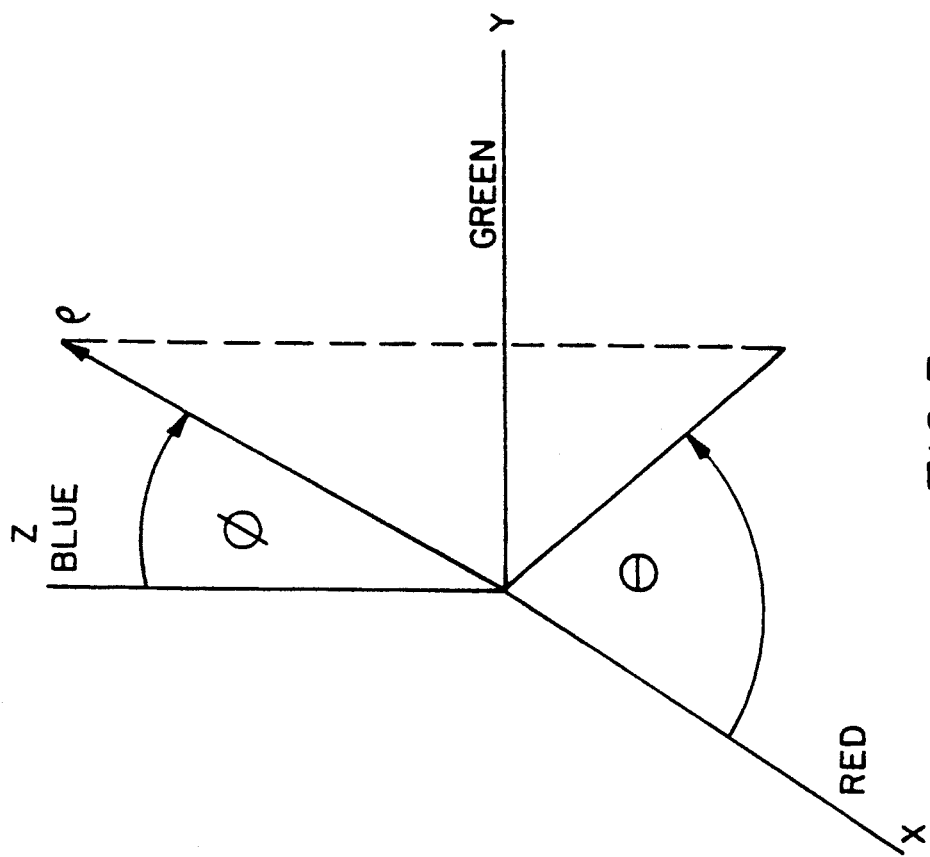
FIG. 3 illustrates a spherical coordinate system for plotting a specific measured color variable according to measured components of red, blue and green transposed into rho ($\rho$), phi ($\theta$) and theta ($\phi$) coordinates in a spherical coordinate system.
Figure 1:
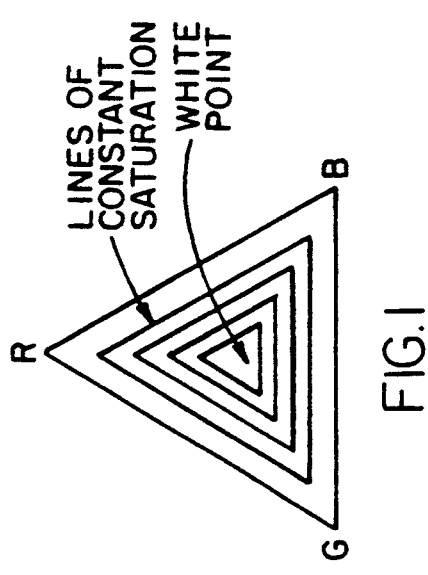
FIG. 1 illustrates an equilateral triangular color map with the three primary colors RGB at its vertices which is used to map red, green and blue chromaticity coordinates, and is useful in understanding color.

The present invention is based upon the premise that in a spherical coordinate system as illustrated in FIG. 3, a color analysis can be better understood and more easily diagnosed and analyzed.

In one specific exemplary embodiment herein, the present invention relates to a method of rating the quality of color of an object such as a baked product, more particularly a pound cake having a split on the top thereof. In this exemplary embodiment, a computerized visual inspection system uses a color camera to take a color picture of the finished baked product, and rates its overall appearance by measuring specific features and comparing the measured features to standard measurements for the baked product which are considered to be optimum.

The present invention is based upon a premise that an analysis of color is easiest in a spherical coordinate system as illustrated in FIG. 3 rather than in an x,y,z cartesian coordinate system. For example, when $\phi$ (phi) and $\theta$ (theta) are constant and $\rho$ (vector length) is varied, the intensity of a color changes without a change in hue or saturation. This simple example does not allow a determination of how far a color is from a target color, but it does enable a determination of whether two colors are of the same hue or saturation.

For baked loaves of pound cake, as crust color changes, dependent on the amount of bake, $\theta$ (the proportion of red to green) varies proportionately which enables a very accurate measurement of the amount of bake.

In the evaluation of an image of a pound cake with a split, the color of the split is of primary importance. Accordingly, a first step is to analyze the image to determine the boundaries of the split. It was determined through evaluation and experiments that the boundaries of the split could be evaluated by the intensity of red in the pixels of the image.

Figure 4:
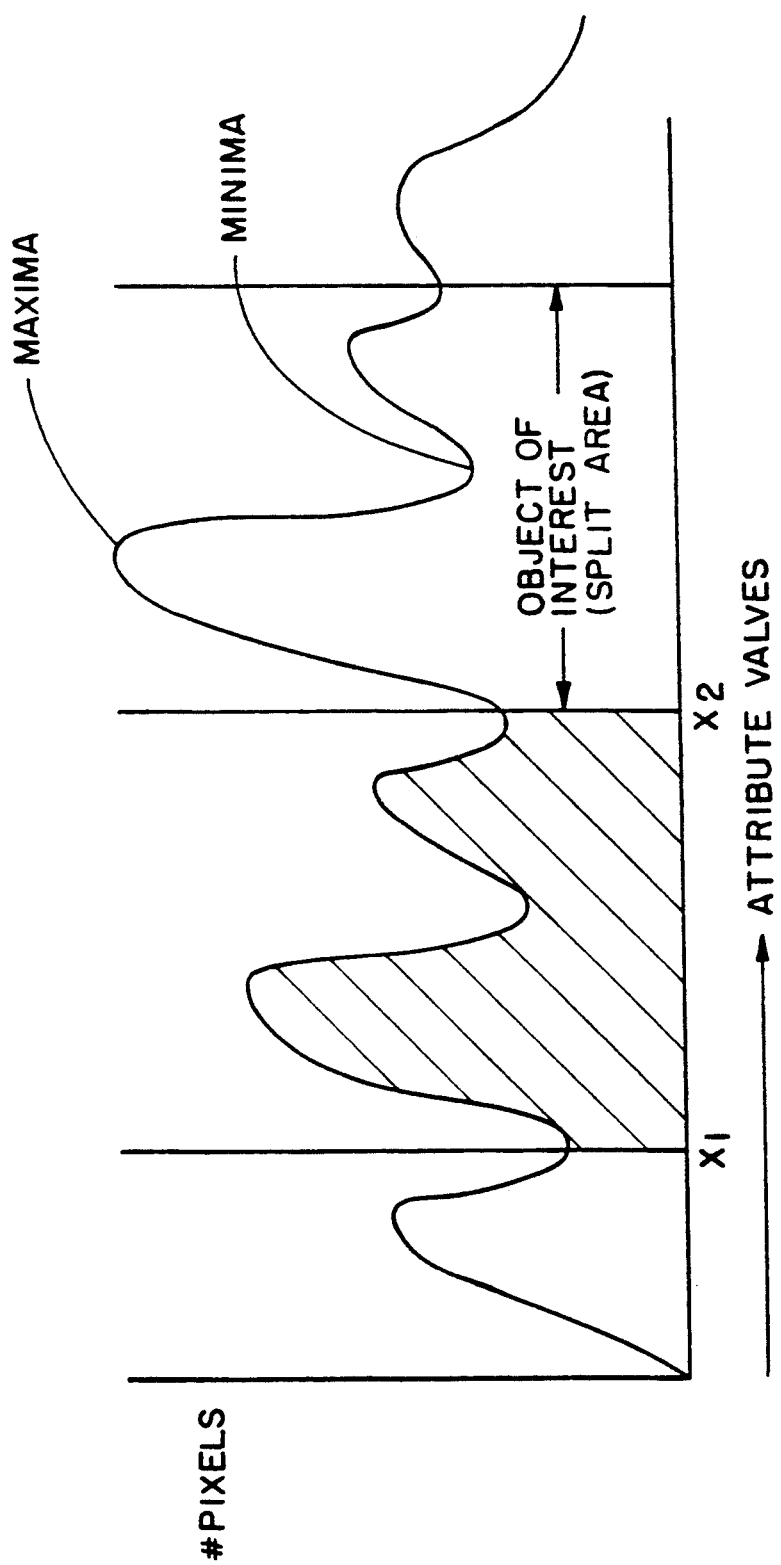
FIG. 4 illustrates a typical color histogram developed from one frame of a color image of a product.

One method of analyzing an image is to set up a histogram of the image. FIG. 4 illustrates a typical histogram developed from one frame of a color image. The abscissa defines a variable such as the intensity or magnitude of a color such as red, green or blue. If the intensity of a color is defined by an eight bit digital word, then x proceeds from 1 to 256. The ordinate is the number of pixels in the total image having each of the discrete (1 to 256) intensity measurements of the color. In particular, the histogram of FIG. 4 is exemplary of a histogram of the amount of red in the total image of a baked pound cake with a split in the top. In such a histogram, the pixels within the split are normally located between the minima before the next to the last maxima and the minima after the last maxima, as illustrated in FIG. 4.

All pixels outside of the area of interest are then disregarded or masked. In this example, with each pixel defined by an eight bit word with values between 0 and 256, all pixels inside of the area of interest are given a value of 1 (1,1,1,1,1,1,1,1). This creates a mask of the split area defined by the color red.

For a baked product such as a pound cake with a split, the amount of bake can be defined accurately by the proportion of red to green, with the amount of blue in the image being of little value in the evaluation.

Accordingly, the red generated mask is applied to the green color measurements in the image to mask out all pixels outside of the masked area of interest. The desired calculation is the proportion of red to green within the masked area of the split.

Moreover, pursuant to the present invention, it was determined that blue is of little value in the evaluation. The z axis is the primary axis in a spherical coordinate system, and the color blue can be selected to be along the z axis. It was hypothesized that the range of possible colors would be in the x,y plane, and that the $\theta$ measurement could then be used to determine the closeness of a measured color to the target color.

Figure 5:
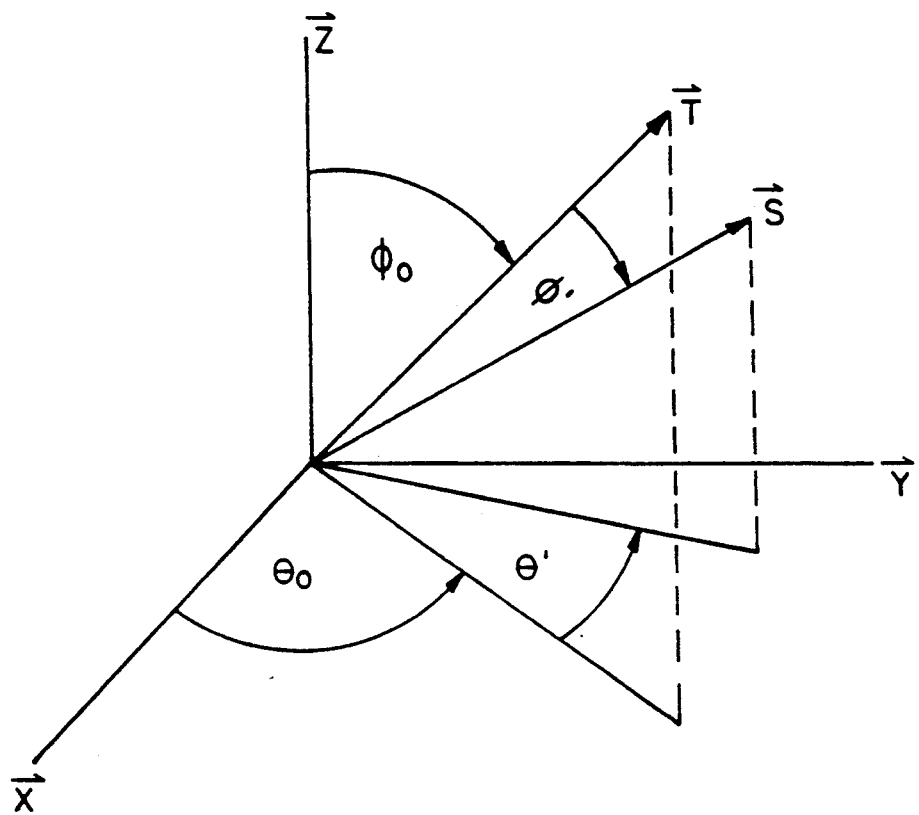
FIG. 5 illustrates a sample color measurement within a rotated spherical coordinate system wherein a reference color is utilized to define the primary z axis in the rotated spherical coordinate system.
Figure 6:
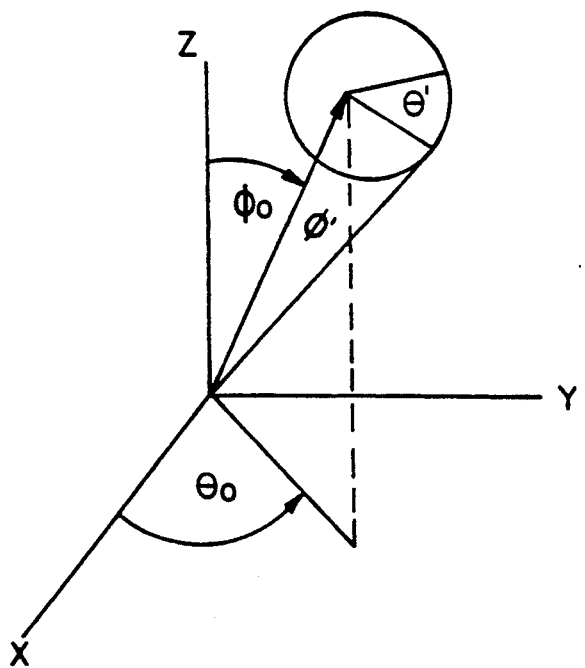
FIG. 6 illustrates a comparison of measured colors in a rotated spherical coordinate system similar to that of FIG. 5.

Referring to FIG. 5, T is a target color vector which defines the new primary axis z' of the rotated spherical coordinate system, S is the sample color vector, $T_o$, $\theta_o$, $\phi_o$ define the T vector in the original spherical coordinate system, the new spherical coordinate system itself defines T therein, and S', $\theta'$, $\phi'$ define S in the new rotated reference spherical coordinate system. Accordingly, referring to FIG. 6, a program was developed which takes a $\theta_o$ and a $\phi_o$ to describe a target color. The program determines the angular distances $\theta'$ and $\phi'$, and displays the allowable variation of color $\theta'$ and color $\phi'$ in terms of degrees from T for $0 < \theta' < 360°$ and $0 < \phi'< \phi'max$.

In the particular example of a baked pound cake, the desired calculation is the proportion of red to green within the masked area, which is determined by $\theta$, which can be determined by taking the arctangent of the ratio of red to green.

Accordingly, the computer program calculates the ratio of red to green for each pixel within the masked area, and calculates an average ratio. The computer program then takes the arctangent of the calculated average ratio to determine $\theta$. If the target color T has a target $\theta$ of 28.5°, then $\theta = 28.5° \pm 2.5°$ can be acceptable thresholds, defining $\theta$ to be acceptable in the range $26° > \theta < 31°$.

The following is a summary of significant components of one specific embodiment of a color analysis system within the context of the above explanation.

1. A color camera such as an RGB single CCD camera provides sampling rates and accuracy of color measurements which are sufficient to enable colors to be distinguished with statistically different values.

2. Constant color temperature light sources and fiber optic line array guides are used to provide diffuse lighting. Diffuse lighting provides a consistent color temperature, eliminates shadows, and best emphasizes differences between features of the products.

3. An Auto Iris Lens is used to compensate for normal differences in reflectance by the products. The current setup has a fixed distance between products and the camera. If this distance became a large variable, an auto-focus lens would be substituted.

4. A computer reads the RGB values from the camera into memory to provide the data for analysis of the image. An algorithm executed by a computer analyzes the color picture to determine the split location and area which are defined by a similarity of color characteristics, and also by criterion of shape and size characteristics.

5. An RGB input monitor displays the frames and other graphical information from the camera and computer.

Figure 7:
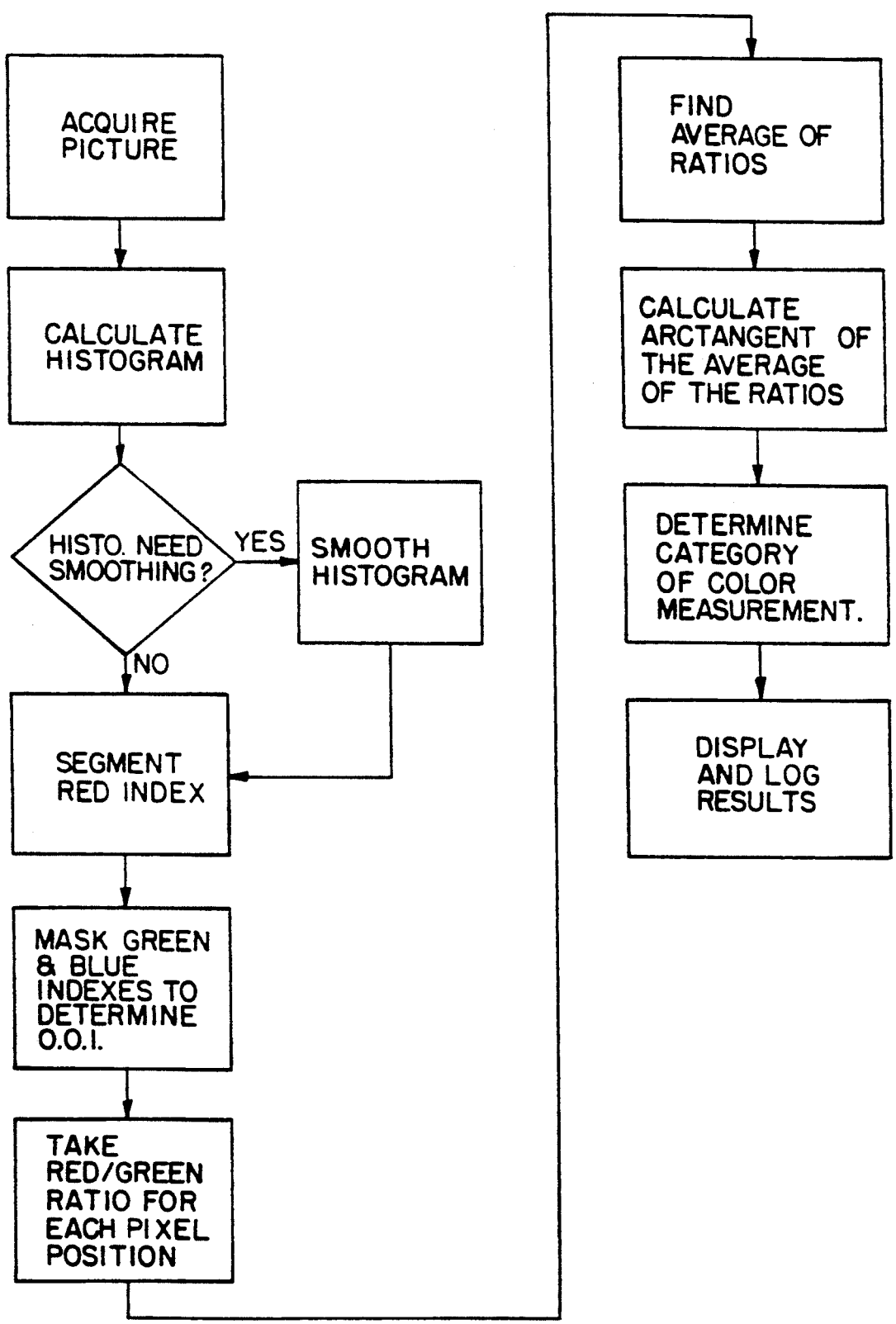
FIG. 7 is a schematic flow chart of a series of steps from acquiring an image of an object through processing of the data in the image, to displaying the results thereof.

FIG. 7 is a schematic flow chart of a series of steps of a generalized color image evaluation method as described herein. A color picture of an object is taken which defines the magnitude of red, green and blue at each pixel location. Each magnitude at each pixel location is digitized, and a histogram is developed similar to FIG. 4.

Algorithms for measurements include object areas, average colors, averages of specific color variables, relative positions of centers, lengths of radii, and ratios of radii for shape factors.

Algorithms to relate measurements to product quality acceptance isolate and measure features which have a direct and simple relationship thereto. When there is a complex relationship or a relationship involving more than one variable, discriminant analysis appears to be the best approach to calculate the product quality measurement.

Current color measurement and evaluation systems expect an object to have constant perimeter values ($x_n$, $y_n$). In baked food products, this is not the case. However, some of the attributes of the histogram area of interest do stay constant or at least proportionally constant.

Referring back to FIG. 7, the histogram can be smoothed. In the specific example of a baked pound cake with a split top, the red index is segmented by the computer based upon the histogram, and is used to mask the green index (and possibly the blue index). The ratio of red to green is taken within the masked area to find the average ratio, the arctangent thereof is determined, a determination is made as to whether the calculated $\theta'$ is within acceptable limits, and the results are displayed and/or logged.

Figures 8, 9:
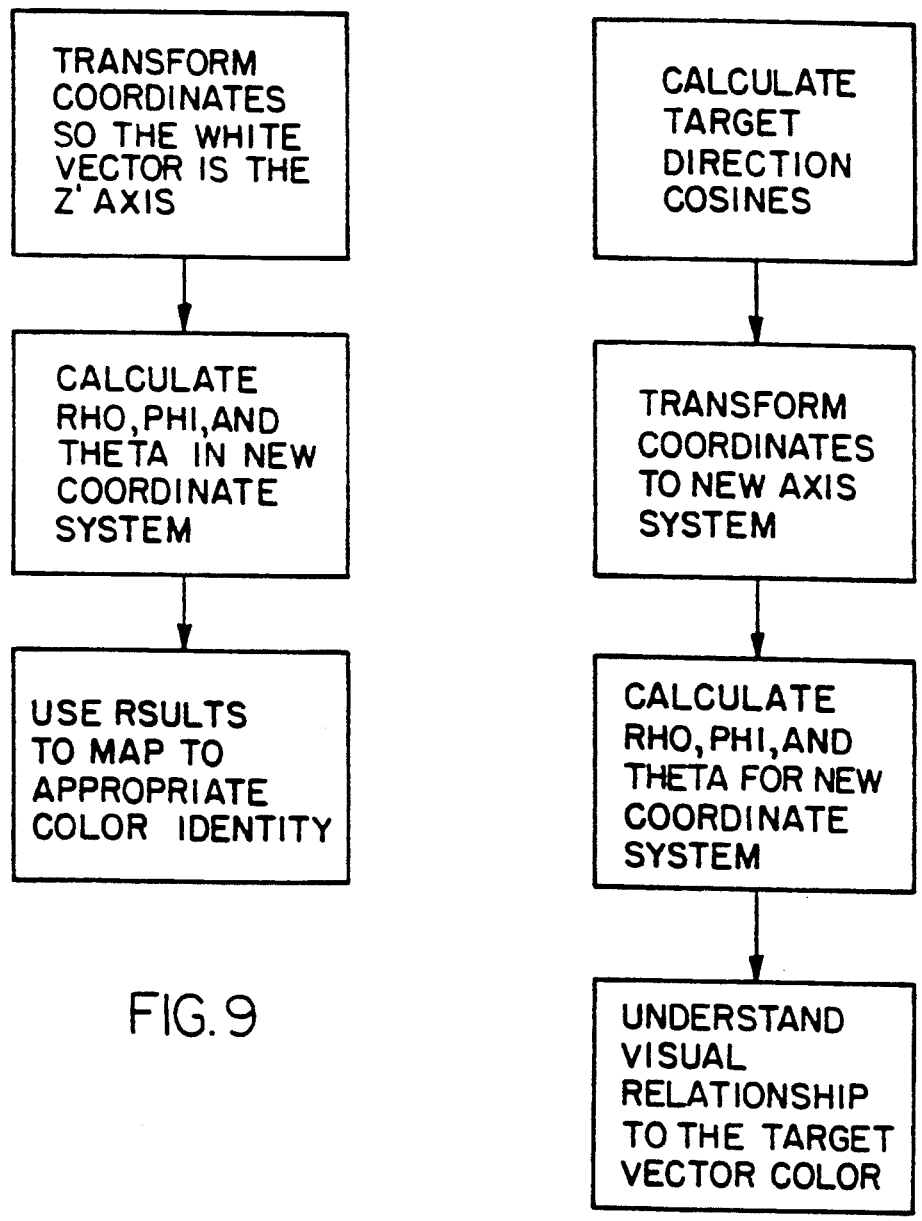
FIGS. 8 and 9 illustrate respectively schematic flow charts for color identification or analysis based upon target color cosines and a white color target vector.

FIG. 8 illustrates a further schematic flow chart for a generalized color identification or analysis method pursuant to the present invention wherein the target color cosines are determined, the color measurements for red, green and blue are transformed to coordinates $\rho'$, $\theta'$ and $\phi'$ in a new coordinate system, and the results are displayed and/or logged in the new coordinate system.

The transformation from red, green and blue measurements in a cartesian coordinate system to a target spherical coordinate system is preferably performed by a computer program which implements the following general equation for transformation to a target coordinate system:

$$\begin{bmatrix} x' \\ y' \\ z' \end{bmatrix} = \begin{bmatrix} \cos\phi_o\cos\theta_o & \cos\phi_o\sin\theta_o & -\sin\phi_o \\ -\sin\theta_o & \cos\theta_o & 0 \\ \sin\phi_o\cos\theta_o & \sin\phi_o\sin\theta_o & \cos\phi_o \end{bmatrix} \begin{bmatrix} R \\ G \\ B \end{bmatrix}$$

where $\phi_o$ and $\theta_o$ describe the target color in red, green, blue spherical coordinates.

FIG. 9 illustrates a further schematic flow chart for a generalized color identification or analysis method pursuant to the present invention wherein the z' primary axis of the rotated reference coordinate axis is chosen to be the color vector white in the original coordinate system, which is defined by $\theta_o = 45°$, and $\phi_o = 54°$, and $\rho$ depends upon the desired intensity level of white. The measured color values, $\rho'$, $\theta'$ and $\phi'$ are calculated in the white reference coordinate system, and the results are displayed and/or logged in the new coordinate system.

The transformation to $\rho$, $\phi$ and $\theta$ in a white target system is preferably performed by a computer program which implements the following general equation for transformation to $\rho$, $\phi$ and $\theta$ in a white target system:

$$\rho' = \sqrt{R^2 + G^2 + B^2}$$

$$\theta' = \tan^{-1}\left[\frac{\sqrt{3}(G - R)}{R + G - 2B}\right]$$

$$\phi' = \cos^{-1}\left[\frac{R + G + B}{\sqrt{3}\sqrt{R^2 + G^2 + B^2}}\right]$$

While several embodiments and variations of the present invention for color analysis based upon transformation to a spherical coordinate system are described in detail herein, it should be apparent that the disclosure and teachings of the present invention will suggest many alternative designs to those skilled in the art.

What is claimed is:

1. A method of analyzing a detected color of an object or an image comprising:
   a. scanning an object or image with a detector to measure three primary color components of each pixel of a matrix of pixels into which the object or image is divided by the detector;
   b. generating a histogram for at least one of the color components by determining the number of pixels having each of a number of subdivisions of magnitude into which the at least one of the color components is divided, wherein one axis of the histogram is the number of pixels and a second axis of the histogram is each subdivision of magnitude of the at least one of the color components;
   c. utilizing the generated histogram to determine an area of interest of the object or image;
   d. transposing the measured primary color components in said area of interest to a spherical coordinate system, and taking the ratio of at least two color components for each pixel in said area of interest, determining the average ratio of the at least two color components for all pixels in said area of interest, and determining the average color angle within the spherical coordinate system which defines the relative hue of those at least two color components; and
   e. determining whether said average color angle is within predetermined minimum and maximum values to determine if the average color angle is within an acceptable color range.

2. A method of analyzing the color of an object or an image as claimed in claim 1, wherein the three measured primary color components are three color magnitudes along respectively the x,y,z axes in a cartesian coordinated system and the three color magnitudes are transposed into the spherical coordinate system by determining $\rho$, $\theta$ and $\phi$ for the three color components in a spherical coordinate system in which $\rho$ is the magnitude of a vector defined by the three color magnitudes in the x,y,z coordinate system, $\theta$ is the angle from the x axis to the vector $\rho$, and $\phi$ is the angle from the z axis to the vector $\rho$, and wherein the $\rho$, $\theta$ and $\phi$ coordinates are analyzed for color by determining if the vector is within the acceptable color range.

3. A method of analyzing a detected color as claimed in claim 2, further comprising:
   a. establishing a reference target color vector having reference color coordinates $\rho_o$, $\theta_o$, $\phi_o$ in the spherical coordinate system; and
   b. comparing the measured color vector $\rho$, $\theta$, $\phi$ with the reference color vector $\rho_o$, $\theta_o$, $\phi_o$ to determine if they are within predetermined color limits.

4. A method of analyzing a detected color as claimed in claim 2, further comprising:
   a. setting up a rotated spherical coordinate system in which the z axis is defined by the reference color vector of $\rho_o$, $\theta_o$, $\phi_o$ in the x,y,z coordinate system; and
   b. transposing the $\rho$, $\theta$ and $\phi$ values to new values $\rho'$, $\theta'$ and $\phi'$ in the rotated spherical coordinate system.

5. A method of analyzing a detected color as claimed in claim 2, in which the three measured primary color components are red, green and blue.

6. A method of analyzing a detected color as claimed in claim 1, wherein said step of determining the average color angle comprises determining the arctangent of the average ratio of the at least two color components to determine an average color angle $\theta$ within the spherical coordinate system.

7. A method of analyzing the color of an object or an image as claimed in claim 1, wherein a selected target color in the spherical coordinate system is utilized as the primary z axis for a second rotated spherical coordinate system, and the average color angle $\theta$ is transformed to a $\theta'$ color angle within the second rotated spherical coordinate system.

8. A method of analyzing the color of an object or an image as claimed in claim 1, wherein the step of generating a histogram comprises selecting one color component and utilizing only the selected one color component to generate the histogram.

9. A method of analyzing the color of an object or an image as claimed in claim 8, wherein said selected one color component is red, and the ratio of the two color components is the ratio of red to green.

10. A method of analyzing the color of an object or an image as claimed in claim 1, wherein the generated histogram is utilized to generate a masked area of interest to mask the remaining color components within the masked area of interest prior to said step of transposing to a spherical system, which is only performed within the masked area of interest.

11. A method of analyzing the color of an object or an image as claimed in claim 10, wherein the object is a baked product having a split, the masked area of interest is the area of the split, and the color analysis is performed to control the baking temperature of an oven for the baked product.

12. A method of analyzing the color of an object or an image as claimed in claim 10, wherein maximas and minimas of the generated histogram are utilized to determine the masked area.

* * * * *